US012697964B2

(12) United States Patent
Kim

(10) Patent No.: US 12,697,964 B2
(45) Date of Patent: Aug. 4, 2026

(54) APPARATUS AND METHOD FOR ASSISTING DRIVING OF A HOST VEHICLE

(71) Applicant: HL KLEMOVE CORP., Incheon (KR)

(72) Inventor: Dongmyeong Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 200 days.

(21) Appl. No.: 18/204,183

(22) Filed: May 31, 2023

(65) Prior Publication Data

US 2023/0398984 A1     Dec. 14, 2023

(30) Foreign Application Priority Data

Jun. 8, 2022     (KR) ........................ 10-2022-0069257

(51) Int. Cl.
| | |
|---|---|
| *B60W 30/09* | (2012.01) |
| *B60W 10/06* | (2006.01) |
| *B60W 10/18* | (2012.01) |
| *B60W 10/20* | (2006.01) |
| *B60W 30/095* | (2012.01) |
| *B60W 50/14* | (2020.01) |
| *G08G 1/16* | (2006.01) |

(52) U.S. Cl.
CPC ............ *B60W 30/09* (2013.01); *B60W 10/06* (2013.01); *B60W 10/18* (2013.01);
(Continued)

(58) Field of Classification Search
CPC ...... B60W 30/09; B60W 10/06; B60W 10/18; B60W 30/0953; B60W 30/0956;
(Continued)

(56) References Cited

U.S. PATENT DOCUMENTS

| | | | |
|---|---|---|---|
| 10,906,559 B1 * | 2/2021 | Cheon | .................. G01S 13/931 |
| 11,628,858 B2 * | 4/2023 | Jiang | ..................... G06N 20/00 |
| | | | 701/26 |

(Continued)

FOREIGN PATENT DOCUMENTS

| | | | | |
|---|---|---|---|---|
| DE | 102020119444 A1 * | 1/2021 | ............ | B60W 30/09 |
| EP | 2211322 B1 * | 11/2016 | ............ | G08G 1/161 |

(Continued)

OTHER PUBLICATIONS

Machine Translation of WO2014192368A1 PDF File Name: "WO2014192368A1_Machine_Translation.pdf" (Year: 2014).*

(Continued)

*Primary Examiner* — Grant Moubry
*Assistant Examiner* — Ruben Picon-Feliciano
(74) *Attorney, Agent, or Firm* — WOMBLE BOND DICKINSON (US) LLP

(57) ABSTRACT

The present document provides an apparatus for assisting driving of a host vehicle that operates according to an operating condition to prevent a forward collision of a host vehicle, the apparatus comprising: a navigation system for providing location information of the host vehicle; a sensor for detecting forward of the host vehicle and the presence or absence of a pedestrian in front of the host vehicle; and a controller communicatively connected to the sensor, wherein the controller is configured to determine whether the host vehicle has entered a driving caution area based on at least one of location information of the host vehicle and forward information of the host vehicle, and mitigate an operating condition of the forward collision avoidance system if the host vehicle has entered the driving caution area and the pedestrian is present in the driving caution area.

10 Claims, 7 Drawing Sheets

(52) U.S. Cl.
CPC .... *B60W 30/0953* (2013.01); *B60W 30/0956*
(2013.01); *B60W 50/14* (2013.01); *G08G*
*1/166* (2013.01); *B60W 10/20* (2013.01);
*B60W 2050/146* (2013.01); *B60W 2554/4029*
(2020.02)

(58) Field of Classification Search
CPC ................. B60W 50/14; B60W 10/20; B60W
2050/146; B60W 2554/4029; B60W
2050/009; B60W 10/184; B60W 2520/10;
B60W 2554/4041; B60W 2554/801;
B60W 2554/802; B60W 2554/804; B60W
2556/50; B60W 2710/0666; B60W
2710/182; B60W 30/08; B60W 40/02;
B60W 40/10; B60W 40/105; B60W
2050/143; B60W 2554/4042; B60W
2554/4044; G08G 1/166; G01S 19/13
See application file for complete search history.

(56) References Cited

U.S. PATENT DOCUMENTS

| | | | | | |
|---|---|---|---|---|---|
| 11,794,643 | B2 * | 10/2023 | Braeuchle | .............. | B60Q 9/008 |
| 2007/0050110 | A1 * | 3/2007 | Kondoh | .............. | B60W 30/146 |
| | | | | | 701/1 |

| | | | | | |
|---|---|---|---|---|---|
| 2019/0092320 | A1 * | 3/2019 | Nagata | .................. | B60W 30/09 |
| 2019/0276013 | A1 * | 9/2019 | Kim | ................... | B60W 30/085 |
| 2021/0370921 | A1 * | 12/2021 | Silva | ................ | B60W 60/0027 |
| 2021/0402966 | A1 * | 12/2021 | Oh | ........................... | B60T 7/22 |
| 2022/0219684 | A1 * | 7/2022 | Shimizu | ............. | B60W 30/085 |

FOREIGN PATENT DOCUMENTS

| | | | | | |
|---|---|---|---|---|---|
| KR | 20-1998-0039410 | | 9/1998 | | |
| KR | 20170040604 | A * | 4/2017 | ........... | B60W 30/08 |
| KR | 10-2018-0130185 | | 12/2018 | | |
| KR | 10-2022-0001029 | | 1/2022 | | |
| WO | WO-2014192368 | A1 * | 12/2014 | ............... | B60T 7/22 |

OTHER PUBLICATIONS

Machine Translation of KR20170040604A PDF File Name:
"KR20170040604A_Machine_Translation.pdf" (Year: 2017).*
Machine Translation of DE 102020119444 A1 PDF File Name:
"DE102020119444A1_Machine_Translation.pdf" (Year: 2021).*
Machine Translation of EP 2211322 B1 PDF File Name:
"EP2211322B1_Machine_Translation.pdf" (Year: 2016).*
Office Action dated Jul. 1, 2025 for Korean Patent Application No.
10-2022-0069257 and its English translation from Global Dossier.

\* cited by examiner

120a

110a

120

10

110

APPARATUS AND METHOD FOR ASSISTING DRIVING OF A HOST VEHICLE

CROSS-REFERENCE TO RELATED APPLICATION

This application claims priority to and the benefit of Korean Patent Application No. 2022-0069257, filed on Jun. 8, 2022, the disclosure of which is incorporated herein by reference in its entirety.

BACKGROUND

1. Field of the Invention

The present disclosure relates to an apparatus and a method for assisting driving of a host vehicle, and more particularly, to a collision avoidance system in a driving caution area and a control method thereof.

2. Discussion of Related Art

In general, drivers may face many unexpected dangerous situations while driving due to reasons such as drowsy driving of themselves or others, inexperienced driving, reckless driving, and road conditions.

Accordingly, an advanced driver assistance system (ADAS) has been developed that assists driving safety by allowing the host vehicle to self-determine some of the dangerous situations that occur while driving.

For example, among ADAS technologies, a lane following assist (LFA), a lane keeping assist (LKA), and a forward collision avoidance assist (FCA) that are also applied to autonomous vehicles are functions that help drivers drive more safely.

Among them, the FCA is a driving safety system that alerts a risk to a driver and controls braking of a host vehicle in order to prevent collision with a front obstacle during driving.

Recently, if an accident occurs in a region such as a children protection zone, punishment for drivers has increased. Accordingly, even if the driver performs a defensive driving as much as possible, the pedestrian may approach the host vehicle where it is not thought, so unintentional accidents may inevitably occur.

However, currently, the FCA is designed to operate only in a case where a collision between a host vehicle and a pedestrian is certain by satisfying specific operating conditions in order to prevent malfunction (false alarm and false braking), and thus has a problem in that utilization is lowered in a children protection zone requiring active defensive driving.

SUMMARY OF THE INVENTION

The present disclosure is directed to providing a forward collision avoidance system of a host vehicle capable of preventing an accident that occurs suddenly in a driving caution area where defensive driving is actively necessary.

The technical problems to be achieved in the present disclosure are not limited to the technical problems mentioned above, and other technical problems not mentioned will be clearly understood by those of ordinary skill in the art from the following description.

The present disclosure provides an apparatus for assisting driving of a host vehicle that operates according to an operating condition to prevent a forward collision of a host vehicle, the apparatus comprising: a navigation system for providing location information of the host vehicle; a sensor for detecting forward of the host vehicle and the presence or absence of a pedestrian in front of the host vehicle; and a controller communicatively connected to the sensor, wherein the controller is configured to determine whether the host vehicle has entered a driving caution area based on at least one of location information of the host vehicle and forward information of the host vehicle, and mitigate an operating condition of the forward collision avoidance system if the host vehicle has entered the driving caution area and the pedestrian is present in the driving caution area.

Here, the operating condition is that the pedestrian is approaching in front of the host vehicle and an expected time to collision between the host vehicle and the pedestrian is less than a reference time.

In addition, the controller is configured to issue a warning if the pedestrian is approaching in front of the host vehicle and an expected time to collision between the host vehicle and the pedestrian is less than a first reference time.

In addition, the controller is configured to reduce engine torque of the host vehicle and partially brake the host vehicle if the pedestrian is approaching in front of the host vehicle and the expected time to collision between the host vehicle and the pedestrian is less than a second reference time shorter than the first reference time.

In addition, the controller is configured to completely brake the host vehicle if the pedestrian is approaching in front of the host vehicle and the expected time to collision between the host vehicle and the pedestrian is less than a third reference time shorter than the second reference time.

In addition, the controller is configured to issue a warning if the host vehicle has entered the driving caution area and the pedestrian is present in the driving caution area.

In addition, the controller is configured to set a predetermined area in front of the host vehicle as a collision risk area.

In addition, the forward collision avoidance system of the host vehicle of the present disclosure further includes a second sensor for detecting location of a pedestrian.

In addition, the controller is configured to determine whether the pedestrian is located in the collision risk area and brake the host vehicle if the pedestrian is located in the collision risk area.

In addition, the controller is configured to operate the forward collision avoidance system according to the operating condition if it is determined that the host vehicle has got out of the driving caution area based on the location information of the host vehicle or the forward information of the host vehicle.

In addition, the controller is configured to mitigate the operating condition of the forward collision avoidance system if the speed of the host vehicle is less than a reference speed.

In addition, the present disclosure provides a method for assisting driving of a host vehicle that controls a forward collision avoidance system of the vehicle using an electronic apparatus, comprising: operating the forward collision avoidance system according to an operating condition; receiving at least one of location information of the host vehicle and forward information of the host vehicle and receiving pedestrian information in front of the host vehicle; determining whether the host vehicle has entered a driving caution area based on at least one of the location information of the host vehicle and the forward information of the host vehicle; if it is determined that the host vehicle has entered the driving caution area, determining whether the pedestrian is present in the driving caution area based on the pedestrian information; and if it is determined that the pedestrian is present in the driving caution area, mitigating the operating condition of the forward collision avoidance system.

Here, the step of operating the forward collision avoidance system according to an operating condition comprises issuing a warning if the pedestrian is approaching in front of the host vehicle and an expected time to collision between the host vehicle and the pedestrian is less than a first reference time.

In addition, the step of operating the forward collision avoidance system according to an operating condition further comprises reducing engine torque of the host vehicle and partially braking the host vehicle if the pedestrian is approaching in front of the host vehicle and the expected time to collision between the host vehicle and the pedestrian is less than a second reference time shorter than the first reference time.

In addition, the step of operating the forward collision avoidance system according to an operating condition further comprises completely braking the host vehicle if the pedestrian is approaching in front of the host vehicle and the expected time to collision between the host vehicle and the pedestrian is less than a third reference time shorter than the second reference time.

In addition, the step of mitigating the operating condition of the forward collision avoidance system comprises issuing a warning if the host vehicle has entered the driving caution area and the pedestrian is present in the driving caution area.

In addition, the method further comprises setting a predetermined area in front of the host vehicle as a collision risk area and receiving location information of the pedestrian before mitigating the operating condition of the forward collision avoidance system.

In addition, the step of mitigating the operating condition of the forward collision avoidance system comprises determining whether the pedestrian is located in the collision risk area and braking the host vehicle if the pedestrian is located in the collision risk area.

In addition, the method further comprises, after mitigating the operating condition of the forward collision avoidance system, operating the forward collision avoidance system according to the operating condition if it is determined that the host vehicle has got out of the driving caution area based on the location information of the host vehicle or the forward information of the host vehicle.

In addition, the step of mitigating the operating condition of the forward collision avoidance system is a step of mitigating the operating condition of the forward collision avoidance system if the speed of the host vehicle is less than a reference speed.

According to the present disclosure, it is possible to prevent an accident that occurs suddenly by operating a forward collision avoidance system by alleviating an operating condition in a driving caution area where defensive driving is actively necessary.

In addition, in the case of a child whose behavior is difficult to predict in a children protection zone, by alerting the driver of the presence of a pedestrian in advance before the child suddenly jump right in front of the host vehicle and is about to collide with the host vehicle, the driver can pass through the children protection zone with greater peace of mind.

The effects of the present disclosure are not limited to those mentioned above, and other effects not mentioned will be clearly understood by those of ordinary skill in the art from the following description.

DETAILED DESCRIPTION OF EXAMPLE EMBODIMENTS

Figure 1:
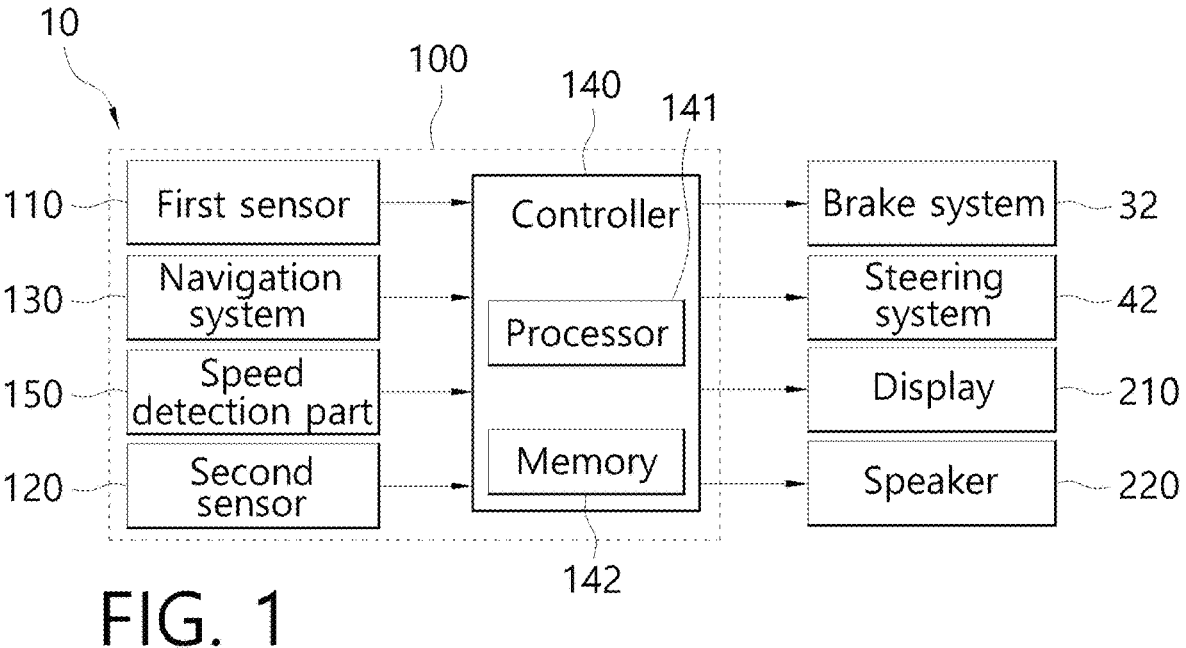
FIG. 1 is a block diagram of an apparatus for assisting driving of a host vehicle according to an exemplary embodiment of the present disclosure.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity of description of the present disclosure. Throughout the specification, like reference numerals denote like elements.

It is understood that the terms "comprise" or "have" when used in this specification, are intended to specify the presence of stated features, integers, steps, operations, elements, components and/or a combination thereof but not preclude the possibility of the presence or addition of one or more other features, integers, steps, operations, elements, components, or a combination thereof.

Figure 2:
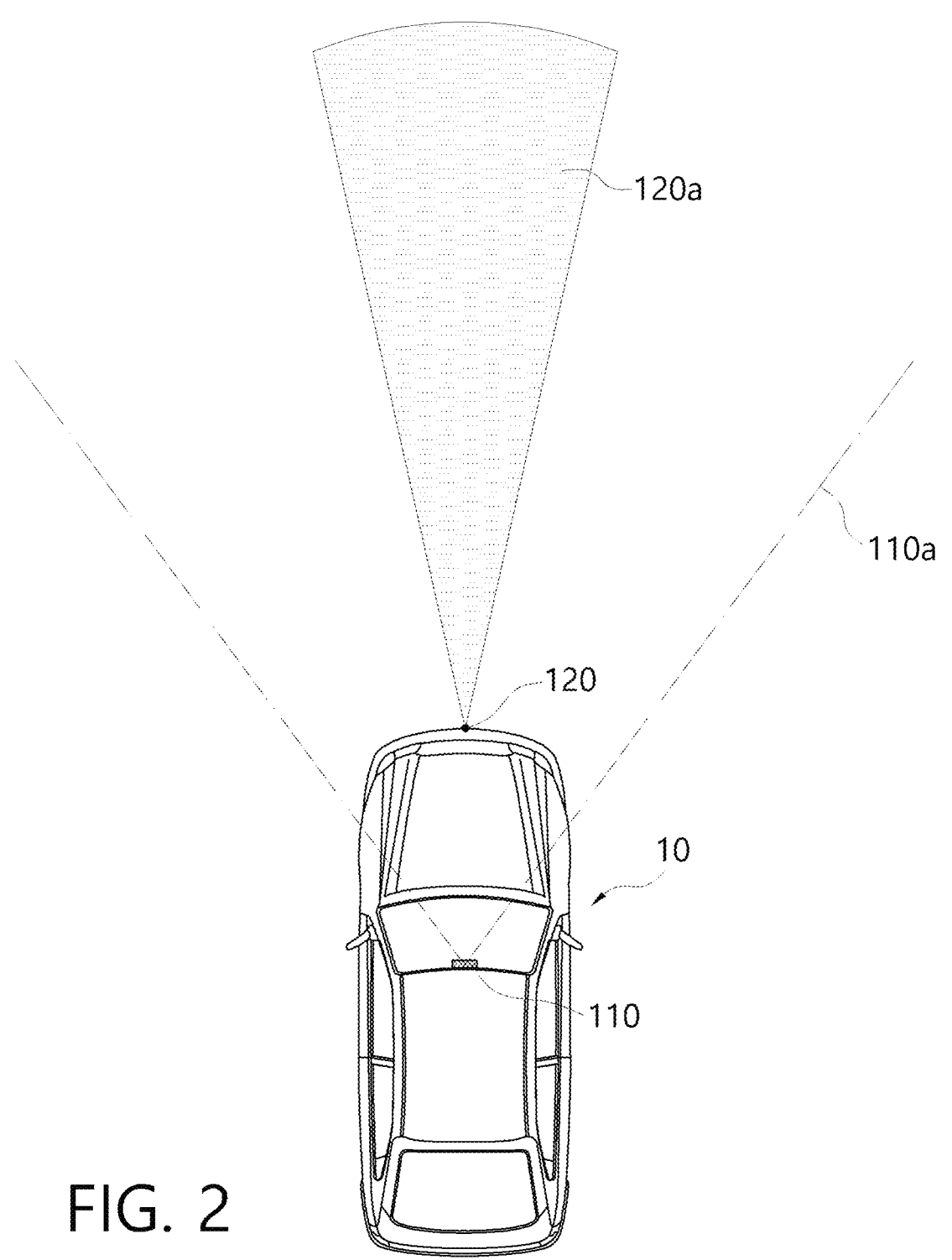
FIG. 2 is a diagram illustrating a sensor included in an apparatus for assisting driving of a host vehicle according to an exemplary embodiment of the present disclosure.

FIG. 1 is a block diagram of an apparatus for assisting driving of a host vehicle according to an exemplary embodiment of the present disclosure, and FIG. 2 is a diagram illustrating a sensor included in an apparatus for assisting driving of a host vehicle according to an exemplary embodiment of the present disclosure.

As shown in FIG. 1, the host vehicle 10 may include a brake system 32, a steering system 42, a forward collision avoidance system 100, a display 210, and a speaker 220.

The forward collision avoidance system 100 may include a first sensor 110, a second sensor 120, a navigation system 130, a controller 140, and a speed detection part 150. Here, the first sensor 110 may be a camera, and the second sensor 120 may be a radar.

As shown in FIG. 2, the first sensor 110 may have a field of view 110a facing the forward of the host vehicle 10. The first sensor 110 may be installed, for example, in the front windshield of the host vehicle 10.

The first sensor 110 may detect forward of the host vehicle 10 and the presence or absence of a pedestrian in front of the host vehicle 10. That is, the first sensor 110 may photograph forward of the host vehicle 10 and obtain forward image data of the host vehicle 1. Here, the forward image data of the host vehicle 10 may include location information about a preceding vehicle 2 or a pedestrian or cyclist or lane located in front of the host vehicle 10.

The first sensor 110 may include a plurality of lenses and an image sensor. The image sensor may include a plurality of photodiodes that convert light into electrical signals, and the plurality of photodiodes may be arranged in a two-dimensional matrix.

The first sensor 110 may be electrically connected to the controller 140. For example, the first sensor 110 may be connected to the controller 140 through a communication network (NT) for the host vehicle, connected to the controller 140 through a hard wire, or connected to the controller 140 through a printed circuit board (PCB). Accordingly, the first sensor 110 may transmit image data in front of the host vehicle 10 to the controller 140.

As shown in FIG. 2, the second sensor 120 may have a sensing field of view 120a facing the forward of the host vehicle 10. The second sensor 120 may be installed, for example, in a grille or bumper of the host vehicle 10.

The second sensor 120 may detect location of another vehicle or a pedestrian located in front of the host vehicle 10.

The second sensor 120 may include a transmitting antenna that radiates transmission radio waves toward the forward of the host vehicle 10 and a receiving antenna that receives reflected radio waves reflected from an object.

The second sensor 120 may obtain radar data from the transmission radio waves transmitted by the transmitting antenna and the reflected radio waves received by the receiving antenna. Radar data may include distance information and degree of speed of another vehicle, a pedestrian or a cyclist located in front of the host vehicle 10.

The second sensor 120 may determine a state distance to the object based on a phase difference (or a time difference) between the transmission radio wave and the reflected radio wave, and determine a relative speed of the object based on a frequency difference between the transmission radio wave and the reflected radio wave.

The second sensor 120 may be connected to the controller 140 through, for example, a communication network (NT) for a host vehicle or a hard wire or a printed circuit board. Accordingly, the second sensor 120 may transmit forward radar data to the controller 140.

The navigation system 130 may include a GPS receiver to provide current location information of the host vehicle 10 to the controller 140, and may provide information on whether the host vehicle 10 is located in a general road or a driving caution area such as a crosswalk vicinity, a children protection zone, a school zone, etc.

The speed detection part 150 may include a wheel sensor to detect a driving speed of the host vehicle 10, and may detect the rotational speed of the wheels of the host vehicle 10 and provide the detected speed to the controller 140.

The controller 140 may include a processor 141 and a memory 142.

Here, the processor 141 may process the forward image data obtained by the first sensor 110 and the forward radar data obtained by the second sensor 120, and generate a braking signal and a steering signal for controlling the brake system 32 and the steering system 42. For example, the processor 141 may include an image processor for processing forward image data, a digital signal processor for processing radar data, and a micro control unit (MCU) for generating a braking signal, a steering signal, and a control signal for controlling the display 210 and the speaker 220.

The processor 141 may detect objects (e.g., a vehicle in front, a pedestrian) in front of the host vehicle 10 based on the image data and the radar data.

Specifically, the processor 141 may obtain location (distance and direction) and relative speed of objects in front of the host vehicle 10 based on the radar data. In addition, the processor 141 may obtain location (direction) and type information (for example, whether the object is another vehicle, or a pedestrian, or a cyclist) of objects in front of the host vehicle 10 based on the image data. In addition, the processor 141 may match the objects detected by the forward image data to the objects detected by the forward radar data, and obtain type information, location and relative speed of the objects in front of the host vehicle 10 based on the matching result.

The processor 141 may determine whether the host vehicle 10 has entered a driving caution area based on at least one of the location information of the host vehicle obtained by the navigation system 130 and the forward information of the host vehicle obtained by the first sensor 110.

The processor 141 may generate a braking signal and a steering signal based on the type information, the location and the relative speed of the objects in front.

The processor 141 may operate the forward collision avoidance system according to an operating condition. Here, the operating condition means that a pedestrian is approaching in front of the host vehicle, and an expected time to collision (TTC) between the host vehicle and the pedestrian is less than reference time.

The processor 141 may determine whether a pedestrian is approaching in front of the host vehicle based on the location information of the pedestrian obtained by the second sensor 120. In addition, the processor 141 may determine an expected time to collision (TTC) until a collision between the host vehicle 10 and the pedestrian based on location (distance) and relative speed of the pedestrian obtained by the second sensor 120.

In addition, the processor 141 may compare the expected time to collision (TTC) with a predetermined reference time and transmit a control signal for warning a collision to the driver to the display 210 and the speaker 220 or transmit a braking signal to the brake system 32.

Specifically, if the pedestrian is approaching in front of the host vehicle 10 and the expected time to collision between the host vehicle 10 and the pedestrian is less than a preset first reference time, the processor 141 may output a warning through the speaker 220 and the display 210.

In addition, if the pedestrian is approaching in front of the host vehicle 10 and the expected time to collision between the host vehicle 10 and the pedestrian is less than a preset second reference time, the processor 141 may transmit a pre-braking signal to the brake system 32. Here, the pre-braking signal may be a signal that reduces the engine torque of the host vehicle 10 and partially brakes the host vehicle 10.

In addition, if the pedestrian is approaching in front of the host vehicle 10 and the expected time to collision between the host vehicle 10 and the pedestrian is less than a preset third reference time, the processor 141 may transmit an emergency braking signal to the brake system 32. Here, the emergency braking signal may be a signal that completely brakes the host vehicle 10.

In this case, the second reference time is shorter than the first reference time, and the third reference time is shorter than the second reference time.

As another example, the processor 141 may determine a distance to collision (DTC) based on a relative speed of a pedestrian in front, compare the distance to collision with a distance to the pedestrian in front to warn the driver of a collision or transmit a braking signal to the brake system 32.

The memory 142 may store a program and data for the processor 141 to process the image data, a program and data for the processor 141 to process the radar data, and a program and data for the processor 141 to generate a braking signal and a steering signal.

The memory 142 may temporarily store image data received from the first sensor 110 and radar data received from the second sensor 120, and may temporarily store processing results of image data and radar data of the processor 141.

The memory 142 may include a volatile memory such as SRAM, DRAM, or the like, as well as a non-volatile memory such as a flash memory, a Read Only Memory (ROM), an Erasable Programmable Read Only Memory (EPROM), or the like.

The forward collision avoidance system 100 is not limited to the configuration shown in FIG. 1, and may further include a lidar that scans around the host vehicle 1 and detects an object.

As such, the forward collision avoidance system 100 is designed to operate only in a case where a collision between a host vehicle and a pedestrian is certain by satisfying specific operating conditions in order to prevent malfunction (false alarm and false braking), and thus has a problem in that utilization is lowered in a driving caution area requiring active defensive driving.

In order to solve this problem, even if the operating condition is not satisfied, the processor 141 may more actively operate the forward collision avoidance system 100 by alleviating the operating condition of the forward collision prevention system 100 if the host vehicle 10 enters a driving caution area and a pedestrian is present in the driving caution area.

Further, the processor 141 may mitigate the operating condition of the forward collision avoidance apparatus 100 if the host vehicle 10 enters a driving caution area and the driver's intention to drive defensively is identified. Specifically, if the speed of the host vehicle 10 detected by the speed detection part 150 is less than a reference speed (e.g., 30 km/h), the processor 141 may decrease the operating condition of the forward collision avoidance system 100 to more actively operate the forward collision avoidance system 100.

This is to prevent inconvenience to the driver caused if the operation of the forward collision avoidance system 100 is mitigated even in case the driver has no intention to drive defensively even when the host vehicle 10 enters the driving caution area.

Figure 3:
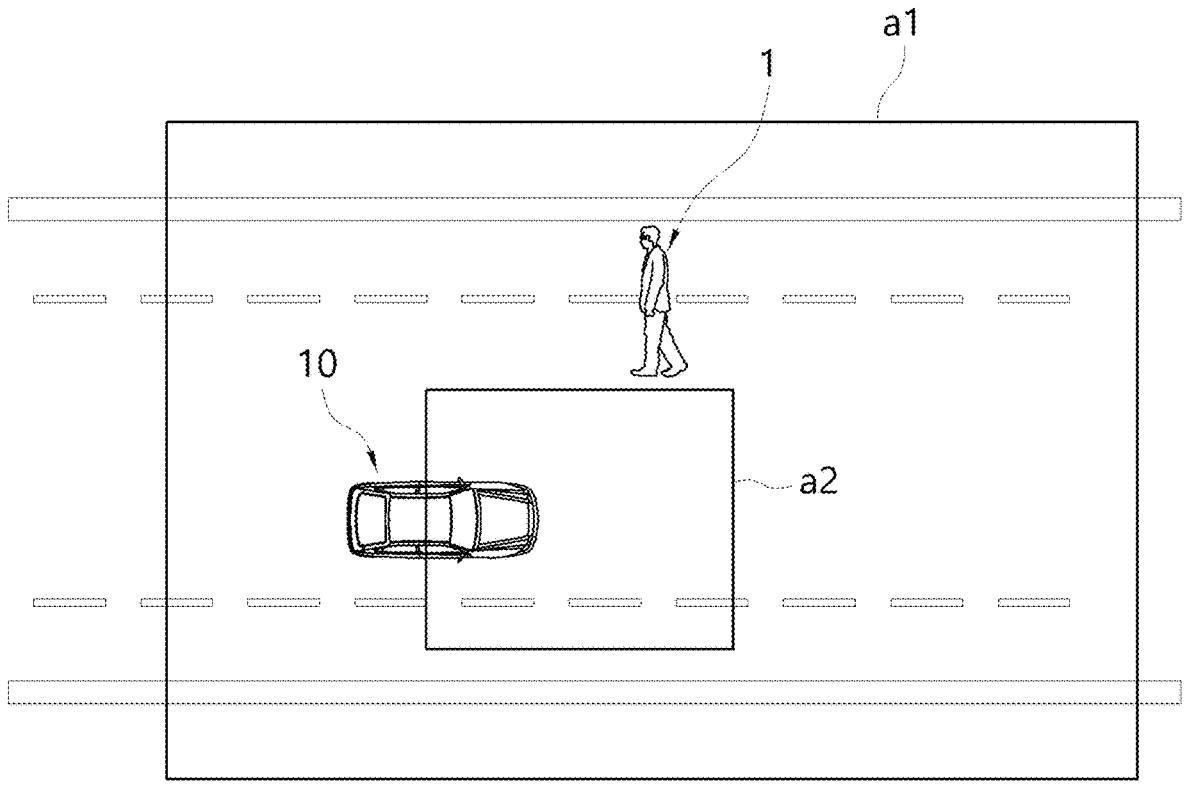
FIGS. 3 and 4 are diagrams for explaining a method of mitigating an operating condition of a forward collision avoidance apparatus of a host vehicle according to an exemplary embodiment of the present disclosure.
Figure 4:
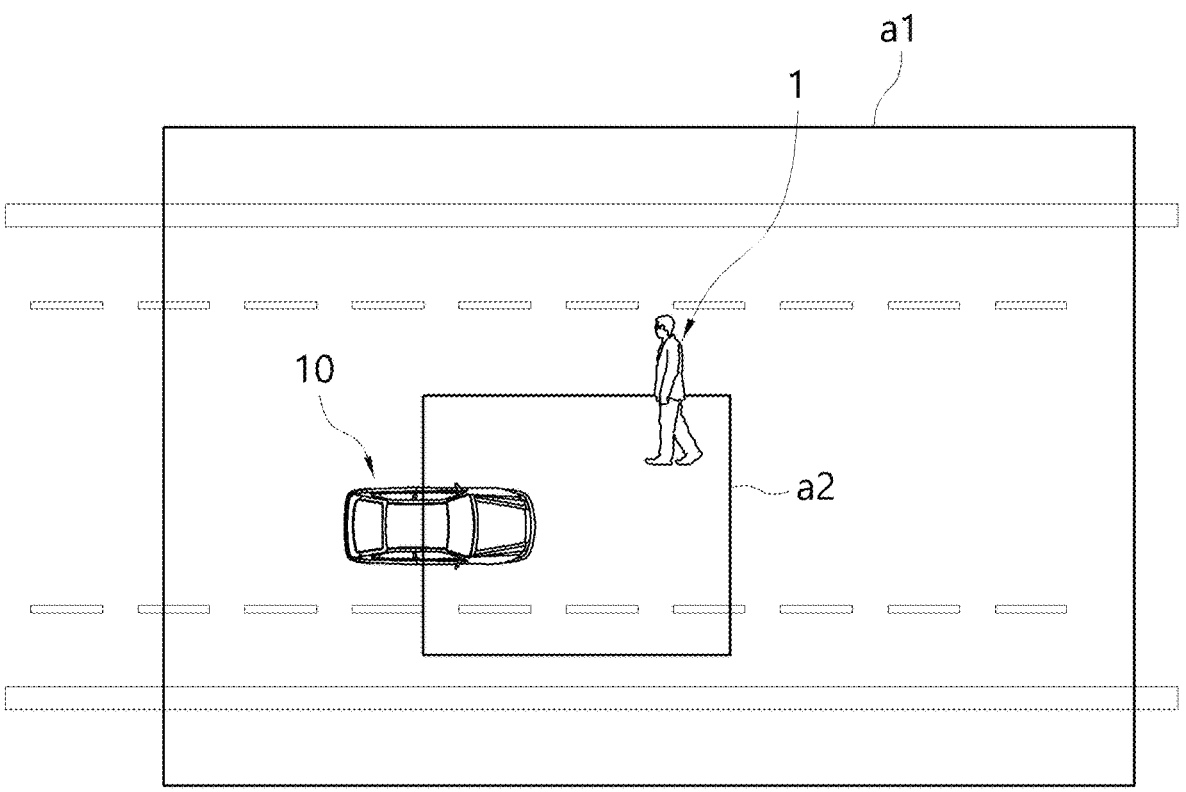

FIGS. 3 and 4 are diagrams for explaining a method of mitigating an operating condition of a forward collision avoidance apparatus of a host vehicle according to an exemplary embodiment of the present disclosure.

Referring to FIG. 3, the processor 141 may issue a warning through the display 210 and the speaker 220 if the host vehicle 10 enters a driving caution area a1 and a pedestrian 1 is present in the driving caution area a1.

Specifically, the display 210 may output a message for the driving caution area and a message for the presence of the pedestrian 1, and the speaker 220 may output a warning message or a warning sound.

The processor 141 may set a predetermined area in front of the host vehicle 10 as a collision risk area a2.

The processor 141 may determine a high-risk pedestrian and a low-risk pedestrian based on information on a pedestrian 1 in front of the host vehicle 10, and may set the collision risk area a2 differently depending on the high-risk pedestrian and the low-risk pedestrian. Here, the high-risk pedestrian may be a child, the low-risk pedestrian may be an adult, and the collision risk area a2 of children may be set wider than that of adults because the predictability of children's behavior is relatively lower than that of adults.

Specifically, the processor 141 may determine a pedestrian with a height of less than a certain height as a high-risk pedestrian, and a pedestrian with a height of a certain height or more as a low-risk pedestrian, based on information on the height of the pedestrian 1. In addition, the collision risk area a2 for the high-risk pedestrian may be set to be wider than the collision risk area a2 for the low-risk pedestrian.

In addition, the processor 141 may determine the number of pedestrians 1 based on information on the pedestrians 1 in front of the host vehicle 10, and may reduce or expand the collision risk area a2 depending on the number of pedestrians 1.

Specifically, since the probability of collision increases as the number of pedestrians 1 increases, the processor 141 may expand the collision risk area a2 as the number of pedestrians 1 increases.

In addition, the processor 141 may determine whether the pedestrian 1 is moving and the approaching speed of the pedestrian 1 based on information on the pedestrian 1 in front of the host vehicle 10, and may reduce or expand the collision risk area a2 depending on whether the pedestrian 1 is moving and the approaching speed of the pedestrian 1.

Specifically, the processor 141 may expand the collision risk area a2 when the pedestrian 1 is moving because the possibility of collision is higher when the pedestrian is moving than when the pedestrian is stationary. In addition, the processor 141 may expand the collision risk area a2 because the possibility of collision increases as the approaching speed of the pedestrian 1 increases.

Referring to FIG. 4, the processor 141 may determine whether the pedestrian 1 is located in the collision risk area a2 based on the location information of the pedestrian 1 obtained by the second sensor 120, and may brake the host vehicle 10 if the pedestrian 1 is located in the collision risk area a2. That is, the processor 141 provides a braking signal to the brake system 32 to enable the brake system 32 to brake the host vehicle 10.

As described above, the forward collision avoidance system 100 of the host vehicle according to an embodiment of the present disclosure may prevent an accident that occurs suddenly by operating the forward collision avoidance system 100 by alleviating an operating condition in a driving caution area where defensive driving is actively necessary.

In particular, in the case of a child whose behavior is difficult to predict in a children protection zone, by alerting the driver of the presence of a pedestrian in advance before the child suddenly jump right in front of the host vehicle and is about to collide with the host vehicle, the driver can pass through the children protection zone with greater peace of mind.

In addition, the forward collision avoidance apparatus of the host vehicle according to an embodiment of the present disclosure may flexibly adjust the collision risk area a2 depending on whether the pedestrian is a child, the number of pedestrians, whether the pedestrian is moving, and the approaching speed, thereby minimizing the inconvenience of the driver and preventing an accident difficult to predict in the collision risk area.

Figure 5:
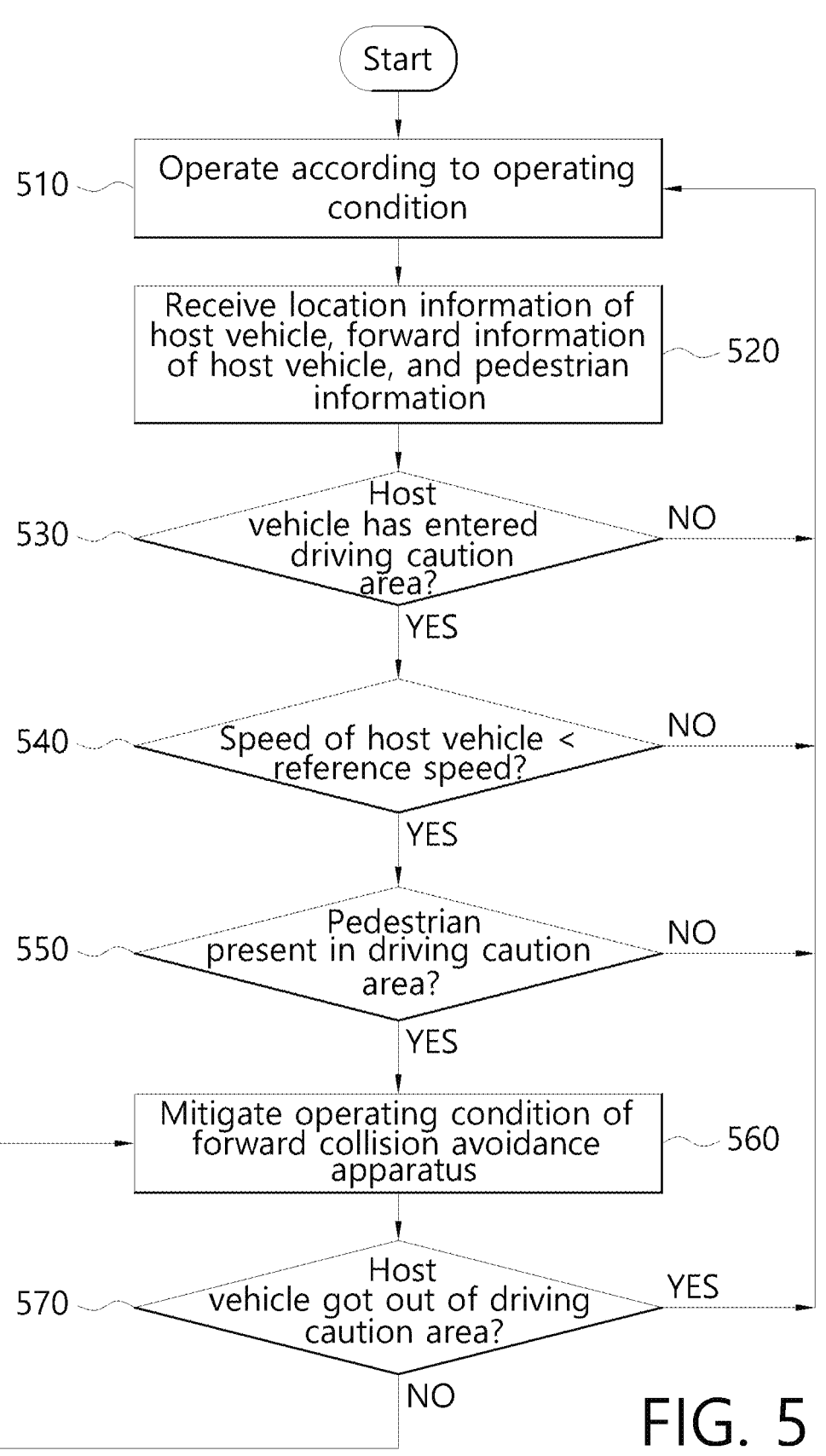
FIG. 5 is a general control flowchart of a forward collision avoidance apparatus of a host vehicle according to an exemplary embodiment of the present disclosure.
Figure 6:
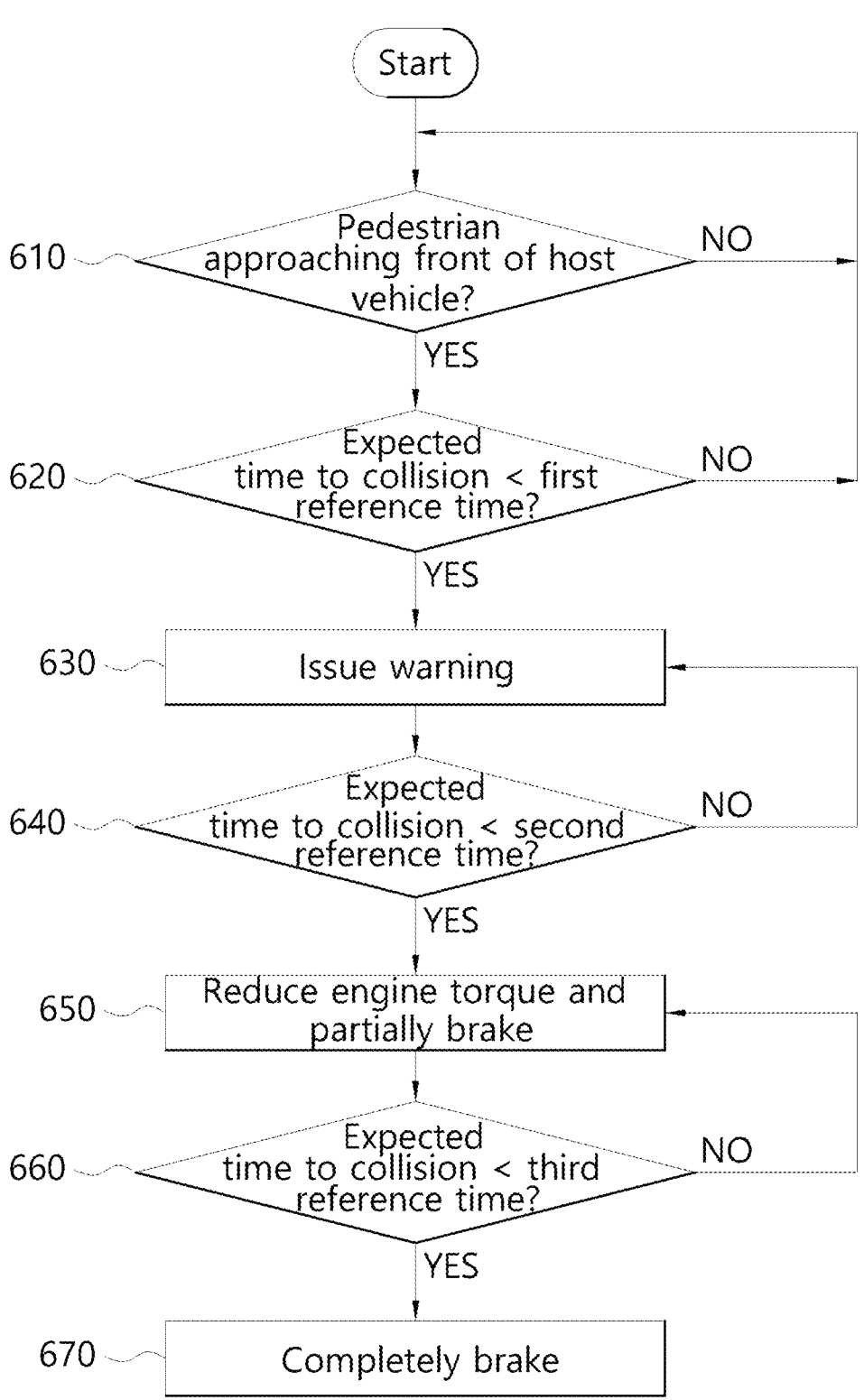
FIG. 6 is a control flowchart according to an operating condition of a forward collision avoidance apparatus of a host vehicle according to an exemplary embodiment of the present disclosure.
Figure 7:
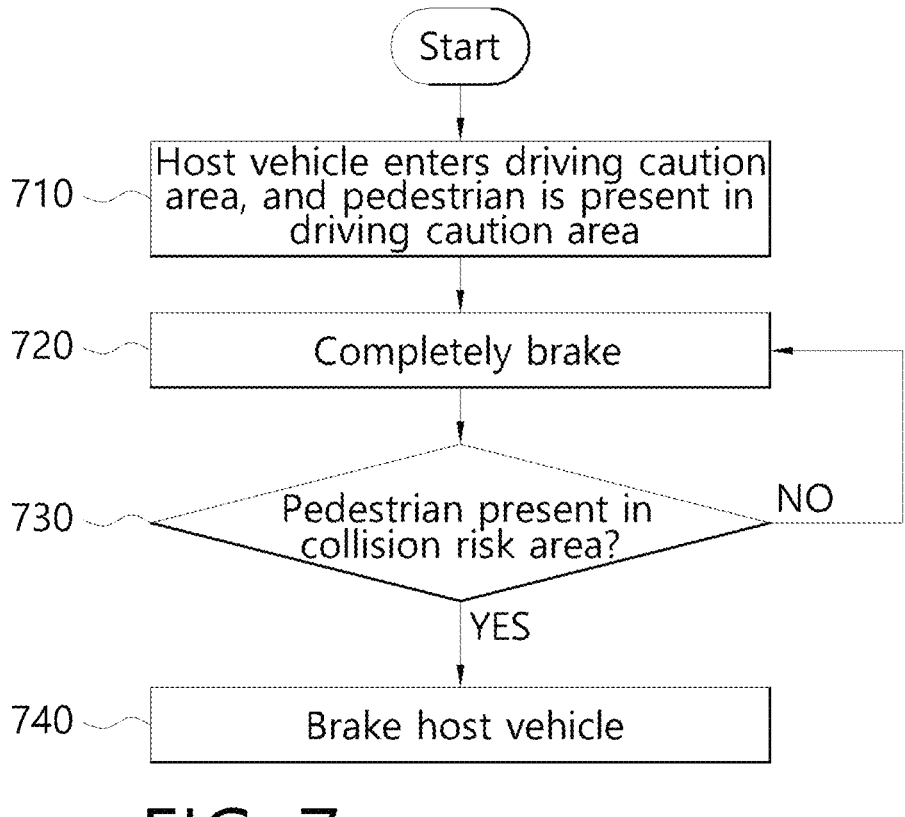
FIG. 7 is a control flowchart in which an operating condition of a forward collision avoidance apparatus of a host vehicle according to an exemplary embodiment of the present disclosure is mitigated.

FIG. 5 is a general control flowchart of a forward collision avoidance apparatus of a host vehicle according to an exemplary embodiment of the present disclosure, FIG. 6 is a control flowchart according to an operating condition of a forward collision avoidance apparatus of a host vehicle according to an exemplary embodiment of the present disclosure, and FIG. 7 is a control flowchart in which an operating condition of a forward collision avoidance apparatus of a host vehicle according to an exemplary embodiment of the present disclosure is mitigated.

Hereinafter, a method of controlling a forward collision avoidance system according to an embodiment of the present disclosure using an electronic apparatus will be described based on the configuration of the forward collision avoidance system 100.

Referring to FIG. 5, first, the forward collision avoidance apparatus is operated according to an operating condition at step S510. Here, the operating condition means a case where a pedestrian 1 is approaching in front of the host vehicle 10 and an expected time to collision between the host vehicle 10 and the pedestrian 1 is less than a reference time.

Next, a predetermined area in front of the host vehicle 10 is determined as a collision risk area a2. In this case, a high-risk pedestrian and a low-risk pedestrian may be determined based on information on the pedestrian 1 in front of the host vehicle 10, and the collision risk area a2 may set differently depending on the high-risk pedestrian and the low-risk pedestrian. Specifically, the processor 141 may determine a pedestrian with a height of less than a certain height as a high-risk pedestrian, and a pedestrian with a height of a certain height or more as a low-risk pedestrian, based on information on the height of the pedestrian 1. In addition, the collision risk area a2 for the high-risk pedestrian may be set to be wider than the collision risk area a2 for the low-risk pedestrian.

Next, at least one of location information of the host vehicle 10 and forward information of the host vehicle is received from the navigation system 130 and the first sensor 110, and pedestrian information in front of the host vehicle 10 is received at step S520.

Next, it is determined whether the host vehicle has entered the driving caution area a1 based on at least one of location information of the host vehicle 10 and forward information of the host vehicle at step S530.

Next, if it is determined that the host vehicle 10 has entered the driving caution area a1, it is determined whether the speed of the host vehicle 10 detected by the speed detection part 150 is less than a reference speed (e.g., 30 km/h) at step S540. In this case, if the speed of the host vehicle 10 is less than the reference speed (e.g., 30 km/h), it may be determined that the driver has an intention to drive defensively.

Next, if it is determined that the driver has an intention to drive defensively, it is determined whether a pedestrian 1 is present in the driving caution area a1 based on the presence or absence and the location information of the pedestrian 1 received from the first sensor 110 and the second sensor 120 at step S550.

Next, if it is determined that the pedestrian 1 is present in the driving caution area a1, the operating condition of the forward collision avoidance system 100 is mitigated at step S560.

Next, it is determined whether the host vehicle 10 has got out of the driving caution area a2 based on the location information of the host vehicle 10 and the forward information of the host vehicle at step S570.

Next, if it is determined that the host vehicle 10 has got out of the driving caution area a2, the forward collision avoidance system 100 is operated again according to the operating condition at step S510.

Referring to FIG. 6, in step S510 where the forward collision avoidance system 100 is operated according to the operating condition, first, it is determined whether the pedestrian 1 is approaching the front of the host vehicle 10 at step S610, and if it is determined that the pedestrian 1 is approaching the front of the host vehicle 10, it is determined whether an expected time to collision between the host vehicle 10 and the pedestrian 1 is less than a first reference time at step S620.

Next, if the expected time to collision is less than the first reference time, a warning is issued through the display 210 and the speaker 220 at step S630.

Next, it is determined whether the expected time to collision between the host vehicle 10 and the pedestrian 1 is less than a second reference time shorter than the first reference time at step S640, and if the expected time to collision is less than the second reference time, the engine torque of the host vehicle 10 is reduced and the host vehicle 10 is partially braked at step S650.

Next, it is determined whether the expected time to collision between the host vehicle 10 and the pedestrian 1 is less than a third reference time shorter than the second reference time at step S660, and if the expected time to collision is less than the third reference time, the host vehicle 10 is completely braked at step S670.

Referring to FIG. 7, in step S560 where the operating condition of the forward collision avoidance system 100 is mitigated, first, if the host vehicle 10 has entered the driving caution area a1, the pedestrian 1 is present in the driving caution area a1, and the speed of the host vehicle 10 is less than the reference speed at step S710, a warning is issued at step S720.

Next, the location information of the pedestrian 1 is received from the second sensor 120, and based on the received location information of the pedestrian 1, it is determined whether the pedestrian 1 is located in a predetermined collision risk area a2 in front of the host vehicle 10 at step S730.

In this case, the number of pedestrians 1 may be determined based on information on the pedestrians 1 in front of the host vehicle 10, and the collision risk area a2 may be reduced or expanded depending on the number of pedestrians 1. Specifically, since the probability of collision increases as the number of pedestrians 1 increases, the collision risk area a2 may be expanded as the number of pedestrians 1 increases.

In addition, it may be determined whether the pedestrian 1 is moving and the approaching speed of the pedestrian 1 based on information on the pedestrian 1 in front of the host vehicle 10, and the collision risk area a2 may be reduced or expanded depending on whether the pedestrian 1 is moving and the approaching speed of the pedestrian 1. Specifically, the collision risk area a2 may be expanded when the pedestrian 1 is moving because the possibility of collision is higher when the pedestrian is moving than when the pedestrian is stationary. In addition, the collision risk area a2 may expanded because the possibility of collision increases as the approaching speed of the pedestrian 1 increases.

Next, if the pedestrian 1 is located in the collision risk area a2, the host vehicle 10 is braked.

As described above, the control method for the forward collision avoidance system 100 of the host vehicle according to an embodiment of the present disclosure may prevent an accident that occurs suddenly by operating the forward collision avoidance system 100 by alleviating an operating condition in a driving caution area where defensive driving is actively necessary.

In particular, in the case of a child whose behavior is difficult to predict in a children protection zone, by alerting the driver of the presence of a pedestrian in advance before the child suddenly jump right in front of the host vehicle and is about to collide with the host vehicle, the driver can pass through the children protection zone with greater peace of mind.

In addition, the control method for the forward collision avoidance apparatus 100 of the host vehicle according to an embodiment of the present disclosure may flexibly adjust the collision risk area a2 depending on whether the pedestrian is a child, the number of pedestrians, whether the pedestrian is moving, and the approaching speed, thereby minimizing the inconvenience of the driver and preventing an accident difficult to predict in the collision risk area.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the scope of the same spirit, but the embodiments will be also within the scope of the present disclosure.

What is claimed is:

1. An apparatus for assisting driving of a host vehicle, the apparatus comprising:
a navigation system configured to provide first information, the first information comprising location information of the host vehicle;
a sensor configured to provide second information, the second information comprising at least forward information of the host vehicle or detectable pedestrian information;
a processor configured to:
receive the first and the second information, determine whether the host vehicle has entered a first area based on at least the first information or the second information, the first area being a driving caution area, determine a second area relative to the host vehicle, and
brake the host vehicle when the host vehicle is located in the first area and at least one pedestrian is located in the second area;
wherein the processor is further configured to:
determine a high-risk pedestrian, a height of the high-risk pedestrian being smaller than a predetermined height, determine a third area for the high-risk pedestrian, the third area wider than the second area;
brake the host vehicle when the host vehicle is located in the first area and at least one high-risk pedestrian has entered the third area, wherein the pedestrian information comprises the height of the pedestrian.

2. The apparatus for assisting driving of a host vehicle of claim 1, wherein the processor is further configured to issue a warning if the host vehicle has entered the first area and the pedestrian is present in the first area.

3. The apparatus for assisting driving of a host vehicle of claim 1, wherein the processor is further configured to determine the number of pedestrians and expand the second area when the number of pedestrians increases.

4. The apparatus for assisting driving of a host vehicle of claim 1, wherein the processor is further configured to determine at least one of whether the pedestrian is moving and an approaching speed of the pedestrian and expand the second area when the pedestrian is moving or the approaching speed increases.

5. The apparatus for assisting driving of a host vehicle of claim 1, wherein the processor is configured to perform the operations only if the speed of the host vehicle is less than a reference speed.

6. A method for assisting driving of a host vehicle by a processor, the method comprising:
receiving first information and second information, the first information comprising location information of the host vehicle generated by a navigation system communicatively connected to the processor, the second information, which is generated by a sensor communicatively connected to the processor, comprising at least forward information of the host vehicle or detectable pedestrian information; determining whether the host vehicle has entered a first area based on at least the first information or the second information, the first area being a driving caution area;
determining a second area relative to the host vehicle; and
braking the host vehicle when the host vehicle is located in the first area and at least one pedestrian is located in the second area;
determining a high-risk pedestrian, a height of the high-risk pedestrian being smaller than a predetermined height;
determining a third area for the high-risk pedestrian, the third area wider than the second area;
braking the host vehicle when the host vehicle is located in the first area and at least one high-risk pedestrian has entered the third area; and
wherein the pedestrian information comprises the height of the pedestrian.

7. The method for assisting driving of a host vehicle of claim 6, further comprising issuing a warning if the host vehicle has entered the first area and the pedestrian is present in the first area.

8. The method for assisting driving of a host vehicle of claim 6, further comprising determining the number of pedestrians and expanding the second area when the number of pedestrians increases.

9. The method for assisting driving of a host vehicle of claim 6, further comprising:
determining at least one of whether the pedestrian is moving and an approaching speed of the pedestrian; and
expanding the second area when the pedestrian is moving or the approaching speed increases.

10. An apparatus for assisting driving of a host vehicle, the apparatus comprising:
a navigation system configured to provide first information, the first information comprising location information of the host vehicle;
a sensor configured to provide second information, the second information comprising at least forward information of the host vehicle or detectable pedestrian information;
a processor configured to:
receive the first and the second information,
determine whether the host vehicle has entered a first area based on at least the first information or the second information, the first area being a driving caution area,
determine a second area relative to the host vehicle, and brake the host vehicle when the host vehicle is located in the first area and at least one pedestrian is located in the second area, wherein the processor is further configured to determine at least one of a number of pedestrians increases, a pedestrian is moving or an approaching speed of a pedestrian increases, and wherein the processor is further configured to expand the second area in response to at least one of determining that the number of pedestrian increases, the pedestrian is moving or the approaching speed of the pedestrian increases.

\* \* \* \* \*